US012056213B2

(12) United States Patent
Chatterjee et al.

(10) Patent No.: US 12,056,213 B2
(45) Date of Patent: Aug. 6, 2024

(54) METHOD AND SYSTEM FOR SCENE-AWARE AUDIO-VIDEO REPRESENTATION

(71) Applicant: Mitsubishi Electric Research Laboratories, Inc., Cambridge, MA (US)

(72) Inventors: Moitreya Chatterjee, Urbana, IL (US); Anoop Cherian, Belmont, MA (US); Jonathan Le Roux, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 582 days.

(21) Appl. No.: 17/378,925

(22) Filed: Jul. 19, 2021

(65) Prior Publication Data

US 2023/0020834 A1 Jan. 19, 2023

(51) Int. Cl.

| G06F 18/22 | (2023.01) |
| G06F 18/2323 | (2023.01) |
| G06N 3/08 | (2023.01) |
| G06V 10/426 | (2022.01) |
| G06V 20/40 | (2022.01) |

(52) U.S. Cl.
CPC .......... *G06F 18/2323* (2023.01); *G06N 3/08* (2013.01); *G06V 10/426* (2022.01); *G06V 20/41* (2022.01)

(58) Field of Classification Search
CPC .... G06F 18/2323; G06N 3/08; G06N 3/0895; G06N 3/044; G06N 3/0475; G06N 3/09; G06N 3/045; G06N 3/0464; G06V 10/426; G06V 20/41; G10L 25/57; G10L 25/84

See application file for complete search history.

(56) References Cited

U.S. PATENT DOCUMENTS

| 2021/0248375 A1* | 8/2021 | Geng | .................. G06F 16/9035 |
| 2022/0124543 A1* | 4/2022 | Orhan | .................... G06N 3/006 |

OTHER PUBLICATIONS

Senocak A, Oh TH, Kim J, Yang MH, Kweon IS. Learning to localize sound source in visual scenes. InProceedings of the IEEE Conference on Computer Vision and Pattern Recognition 2018 (pp. 4358-4366). (Year: 2018).*

(Continued)

*Primary Examiner* — Fayyaz Alam
(74) *Attorney, Agent, or Firm* — Gene Vinokur; Hironori Tsukamoto

(57) ABSTRACT

Embodiments disclose a method and system for a scene-aware audio-video representation of a scene. The scene-aware audio video representation corresponds to a graph of nodes connected by edges. A node in the graph is indicative of the video features of an object in the scene. An edge in the graph connecting two nodes indicates an interaction of the corresponding two objects in the scene. In the graph, at least one or more edges are associated with audio features of a sound generated by the interaction of the corresponding two objects. The graph of the audio-video representation of the scene may be used to perform a variety of different tasks. Examples of the tasks include one or a combination of an action recognition, an anomaly detection, a sound localization and enhancement, a noisy-background sound removal, and a system control.

16 Claims, 13 Drawing Sheets

(56) References Cited

OTHER PUBLICATIONS

Zheng Q, Wang C, Tao D. Syntax-aware action targeting for video captioning. InProceedings of the IEEE/CVF conference on computer vision and pattern recognition 2020 (pp. 13096-13105). (Year: 2020).*

Li L, Gan Z, Cheng Y, Liu J. Relation-aware graph attention network for visual question answering. InProceedings of the IEEE/CVF international conference on computer vision 2019 (pp. 10313-10322). (Year: 2019).*

Shijie, et al. Dynamic graph representation learning for video dialog via multi modal shuffled transformers. Arxiv.org Cornell university library. Mar. 2, 2021.

* cited by examiner

METHOD AND SYSTEM FOR SCENE-AWARE AUDIO-VIDEO REPRESENTATION

TECHNICAL FIELD

The present disclosure relates generally to audio-video scene aware recognition, and more particularly to a method and system for processing a scene-aware audio-video representation.

BACKGROUND

Over many years, various techniques to capture a scene of a surrounding environment have been developed. For example, the notion of photography and imaging has been developed hundreds of years ago and gradually transition itself into a digital domain. Initially, a digital image has been defined as a two-dimensional (2D) representation composed of pixels, each with finite, discrete quantities of numeric representation for its intensity or gray level. However, pixel representation is not always convenient for different image-related applications. To that end, alternative representations of the surrounding environment have been developed.

For example, distance field image representation is useful in a variety of graphics applications, including antialiasing, ray marching, and texture synthesis. As an example, the distance fields have been widely used in the simulation of numerical control (NC) applications. Scalable Vector Graphics (SVG) is an Extensible Markup Language (XML)-based vector image format for 2D graphics with support for interactivity and animation. SVG-based representation was found advantageous for map-based applications. Additionally or alternatively, various feature extraction and compression techniques have been developed for more compact and efficient image representation and storage. For example, various object detection and segmentation applications have been developed for analyzing features extracted from the pixels, and not the intensities of the pixels.

A similar tendency for finding different image representations for different applications is observed in the video domain. The video domain presents more challenges though because the representation should capture not only spatial variation of the objects in a spatial domain but also their evolution in a time domain. To that end, many different representations have been developed to capture and store video files. For example, various lossy and lossless compression techniques have been developed to take advantage of the similarity in neighboring video files, various feature extraction techniques have been developed for extracting feature in both spatial and time domain, various graph-based techniques have been developed to represent relationships in time and space of different objects in the video.

To represent the scene of the environment further, digital audio technologies are used in the recording, manipulation, mass-production, and distribution of sound, including recordings of songs, instrumental pieces, podcasts, sound effects, and other sounds. Various technologies depend on a proper audio representation. For example, different audio coding formats have been developed for the storage or transmission of digital audio. Examples of audio coding formats include MP3, AAC, Vorbis, FLAC, and Opus. Further, similar to image processing, various techniques have been proposed for working with features extracted from the audio files. These feature-based techniques are widely used in automatic speech recognition systems.

The representation of a scene becomes an even more challenging problem when there is a need to provide a common representation for both audio and video modalities. While these modalities may represent the same scene, the different modalities may not be naturally aligned with each other. To that end, modern technologies usually address these modalities separately with the addition of pre and post-processing techniques. Examples of the pre-processing techniques include deriving clues from video files to assist audio processing and vice versa. Examples of post-processing techniques include providing audio captions for annotating the video.

However, none of these techniques are suitable for complex and rich representation of the audio-video scene in the environment. Accordingly, there is a need for a new representation of an audio-video scene suitable for other applications and techniques. In addition, there is a need for a system and method configured for generating and processing such a new representation.

SUMMARY

Accordingly, it is an objective of some embodiments to provide a system and method for processing an audio-video representation of a scene in an efficient and accurate manner. Examples of such processing include generating the audio-video representation and executing application-specific tasks based on the audio-video representation. To that end, in one embodiment, a graph-based representation indicative of a scene-aware audio-video representation of a scene of a video is generated. The video may be captured using one or more image/video capturing devices, such as one or more cameras. One or more cameras may be connected to the system, such as a computing system for generating the scene-aware audio-video representation.

Some embodiments are based on the realization that the scene-aware audio-video representation includes a structure mapped on a graph of nodes connected by edges. Each of the nodes in the graph represents an object, e.g., is indicative of video features of an object in the scene. Each of the edges in the graph connects two nodes. Each edge of the graph indicates an interaction of the corresponding two objects in the scene. In such a manner, the graph represents the objects and their interactions.

In some embodiments, the graph representation may be generated based on the detection and classification of objects in the scene. Further, the nodes (i.e., the objects) and the edges (i.e., the interactions of objects) for the graph representation may be selected based on a predetermined set of possible objects and set of possible interactions. The selection of the nodes and the edges enforces the uniqueness of the objects and the interactions. For example, an object may be classified as a person and not as a group of people unless a group of people belongs to the set of possible objects.

Some embodiments are based on understanding that the scene includes a complex interaction of two objects including one or a combination of spatial interaction and time interaction. For instance, the captured scene may include dynamic content with different objects indicative of people, vehicles, or animals, and different audios in a spatial domain as well as the evolution of corresponding objects in a time domain. Further, the scene may also include different interactions or relationships existing among the objects. In a real-time example scenario, the scene may correspond to a busy street with objects, such as people in different actions, vehicles in motion, vehicles in rest, animals running, etc. The people in different actions may include musicians with their musical instruments. In the scene, some musical instruments may be actively played by corresponding musicians, while some musical instruments may not be played.

Additionally or alternatively, it is an objective of some embodiments to generate the graph representation with the complex interaction that includes the spatial and temporal interaction of the objects. To that end, in some embodiments, the graph representation is composed of nodes fully connected by the edges. Each of the nodes indicates an object in the scene and each of the fully connected edges indicates an interaction corresponding to two objects in the spatial and time domain of the scene.

Some embodiments are based on understanding that within an interaction, some objects may equally contribute to generating a sound. In some cases, an object may generate a sound while interacting with another object as well as may contribute to the sound generation on its own. For example, a musician may be singing while playing guitar in the scene. In some other cases, some objects may not equally contribute to the sound generation. For example, a musician may be playing violin without singing. In such cases, those objects that are not equally contributing to the sound generation may be defined based on their type of interaction. To that end, in some embodiments, the corresponding edge of such objects may include an attribute defining the type of interaction. In some example embodiments, the type of interaction may be indicated by the direction of the edge and corresponding nodes (i.e., the objects) connected by the directed edge may be distinguished into a principal object and a context object. For instance, the node indicative of the violin played by the musician corresponds to the principal object and the musician playing the violin corresponds to the context object.

In some implementations, the nodes and/or the edges in the graph may be associated with audio features of a sound generated by an object or by the interaction of the objects. For instance, a node of an object, such as a dog barking while splashing in the water, may be associated with corresponding audio features. Likewise, an edge connecting the principal object and the context object may also associate with audio features. Additionally or alternatively, it is another objective of some embodiments to extract features, such as video features and audio features that include both spatial and temporal information of the scene.

Some embodiments are based on understanding that a joint extraction of video and audio features may improve the overall performance of the system. The joint extraction of the video and audio features may preclude pre-processing and post-processing steps, which may improve the overall performance.

To that end, some embodiments disclose an audio-source separation framework that isolates individual audio of an object from an audio mixture. The audio mixture may correspond to a mixed audio spectrogram that includes changes in frequencies of different audio signals. The audio may be isolated from the audio mixture based on the visual of the objects and corresponding interactions of the objects from the video.

In some embodiments, the audio-source separation framework may include a neural network. The neural network may include a plurality of subnetworks trained end-to-end to associate the audio features to the nodes and/or the edges of the graph. The plurality of subnetworks may include an attention-based subnetwork trained to place different attention to different interactions of objects.

The trained attention-based subnetwork may be used for deriving visual features of the objects in the scene. The visual features correspond to potential auditory elements that guide the audio-source separation framework for isolating the audio of an object from the audio mixture. For instance, visual features of a musical instrument, such as a violin in the scene may guide the audio-source separation framework to isolate a violin sound from the audio mixture.

In some embodiments, the visual features may be extracted as one or more sub-graphs from the graph representation. One or more sub-graphs may provide embedding vectors (i.e., a low-dimensional vector representation) that provide orthogonality to the audio features. Further, the scene may include a variety of sounds for each object. To that end, audio features associated with different objects and/or edges are orthogonal to each other. The orthogonality of the audio features enforces the separation of different individual audios from the variety of sounds. In some embodiments, the audio features associated with the edges may be represented by a binary mask. The binary mask separates the desired audio of an object by separating corresponding audio features of the object from the audio mixture.

Some embodiments are based on an understanding that the scene-aware audio-video representation may serve as an input to other processes or applications. For instance, a computing system may provide the generated scene-aware audio-video representation to a server for performing a task of a corresponding application, such as action recognition and anomaly detection, sound localization and enhancement, or the like. The computing system may be trained on the scene-aware audio-video representation using various machine learning methods. To that end, the structure of the audio-video representation may be used as supervised learning for training a neural network for performing the task. Additionally or alternatively, it is another objective of some embodiments to train the neural network using the generated scene-aware audio-video representation.

In such a manner, the graph according to different embodiments may capture a rich and complex audio-video representation of a scene. Besides, the graph may have a differentiable nature allowing the generation of the graph by a trained neural network and using the generated graph to train other neural networks.

Accordingly, some embodiments disclose a non-transient memory configured to store an audio-video representation of a scene as a graph of nodes connected by edges. A node in the graph is indicative of the video features of an object in the scene. An edge in the graph connecting two nodes indicates an interaction of the corresponding two objects in the scene. In the graph, at least one or more edges are associated with audio features of a sound generated by the interaction of the corresponding two objects.

Accordingly, some other embodiments disclose a system for generating an audio-video representation of a scene. The system includes an input interface, a processor, and an output interface. The input interface is configured to accept audio and video frames of the scene. The processor is configured to execute a neural network trained to transform the accepted audio and video frames into a graph of the audio-video representation of the scene. The graph includes nodes connected by edges, wherein a node in the graph is indicative of video features of an object in the scene, wherein an edge in the graph connecting two nodes indicates an interaction of corresponding two objects in the scene, and wherein at least one or more edges in the graph are associated with audio features of a sound generated by the interaction of two corresponding objects. The output interface is configured to store the graph of the audio-video representation of the scene in memory.

Accordingly, some other embodiments disclose a system that includes a memory configured to store an audio-video representation of a scene as a graph of nodes connected by edges, wherein a node in the graph is indicative of video features of an object in the scene, wherein an edge in the graph connecting two nodes indicates an interaction of corresponding two objects in the scene, and wherein at least one or more edges in the graph are associated with audio features of a sound generated by the interaction of the two corresponding objects and a processor operatively connected to the memory to perform a task using the graph of the audio-video representation of the scene.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
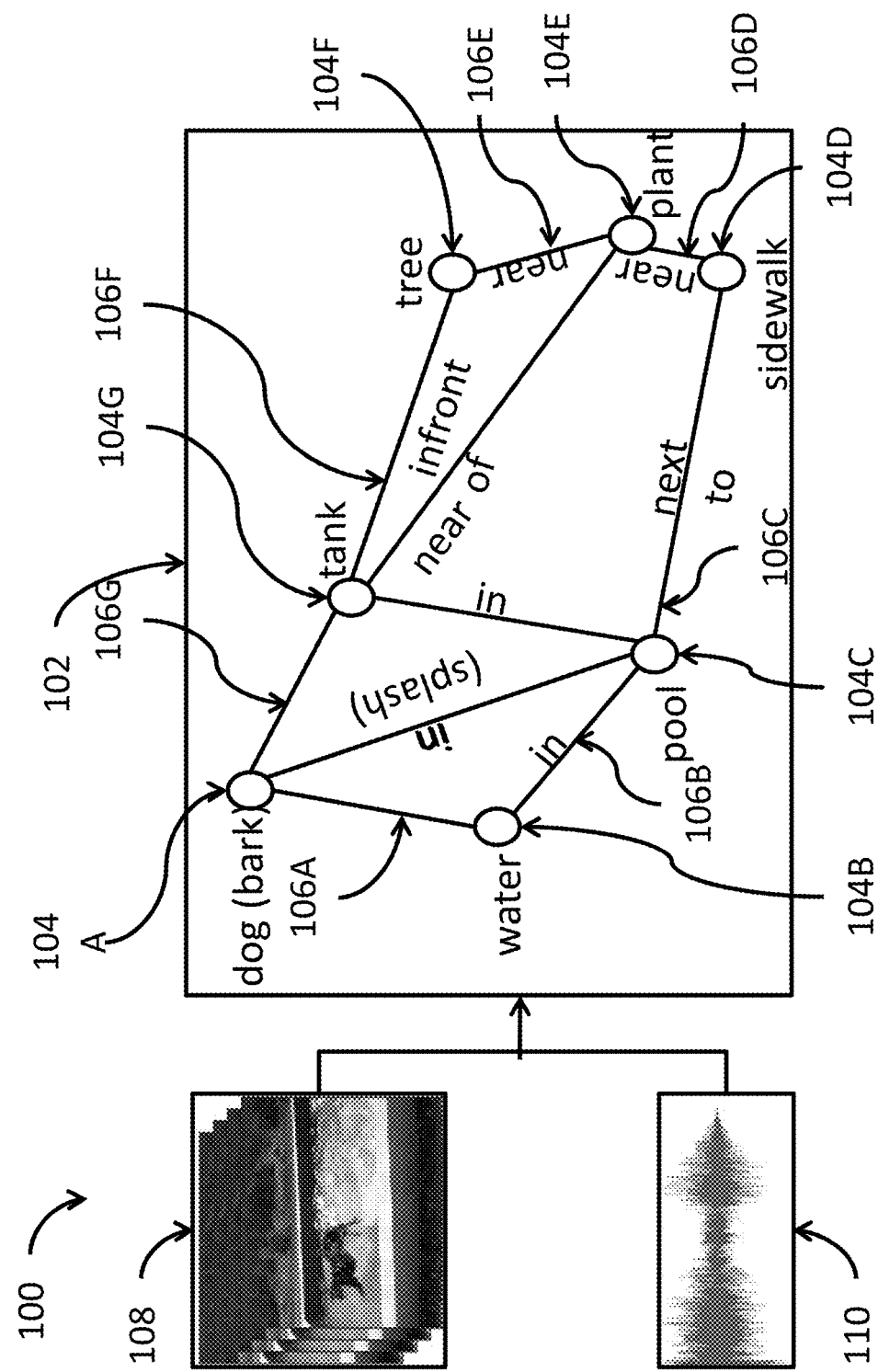
FIG. 1A shows an audio-video representation of a scene as a graph, according to some embodiments.

FIG. 1A shows a representation 100 depicting a graph 102 indicative of a scene-aware audio-video representation of a scene, according to some embodiments. The scene is represented by video 108. Graph 102 includes nodes, such as a node 104A, a node 104B, a node 104C, a node 104D, a node 104E, a node 104F, and a node 104G (referred to hereinafter as the nodes 104A-104G). The nodes 104A-104G are connected by edges, such as an edge 106A, an edge 106B, an edge 106C, an edge 106D, an edge 106E, an edge 106F, and an edge 106G (referred to hereinafter as the edges 106A-106G). Each node of the nodes 104A-104G is indicative of the video features of an object in the scene. For instance, the node 104A indicates a dog, the node 104B indicates water, the node 104C indicates a pool, the node 104D indicates a sidewalk, the node 102E indicates a plant, the node 104F indicates a tree, and the node 104G indicates a tank in the scene. Each edge of the edges 106A-106G connecting two nodes indicates an interaction of the corresponding two objects in the scene. For example, the edge 106A connecting node 104A (i.e., the dog) and node 104B (i.e., the water) indicates an interaction of the dog and the water in the scene. In some cases, at least one node of the nodes 104A-104G may be associated with audio features of a sound generated by a corresponding object without interaction with other objects in the scene. In a similar manner, the edges 106B, 106C, 106D, 106E, 106F, and 106G indicate interaction of corresponding two objects, as shown in FIG. 1A.

Further, in graph 102, some of the nodes 104A-104G and/or the edges 106A-106G are associated with audio features of a sound. For example, node 104A is associated with audio features of a bark sound of the dog in the scene. For example, in this example, the edge 106A is associated with audio features of a splash sound. In the scene, the splash sound is generated due to the interaction between the dog (i.e., node 104A) and the water (i.e., node 104B). The audio features may be obtained from an audio mixture 110.

In some example embodiments, the scene may include a complex interaction of corresponding two objects. Such complex interaction may be included in a graph representation of the scene, which is described next with reference to FIG. 1B.

Figure 1B:
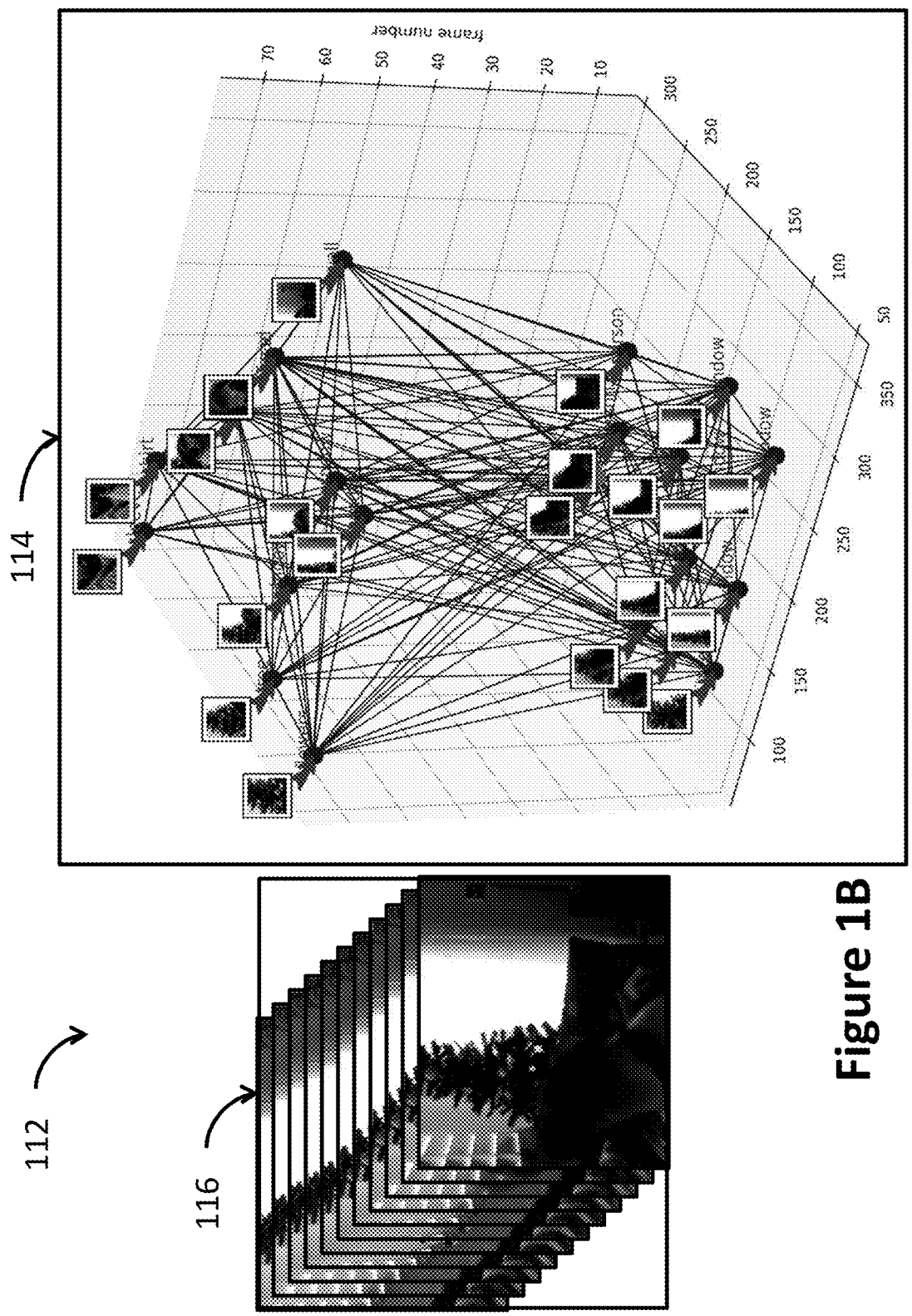
FIG. 1B shows an audio-video representation of a scene as a graph, according to some other embodiments.

FIG. 1B shows a representation 112 depicting a graph 114 indicative of a scene-aware audio-video representation of a scene, according to some other embodiments. The scene corresponds to video 116, as shown in FIG. 1B. In some embodiments, the interaction of corresponding two objects in the scene may include one or a combination of spatial interaction and time interaction of the objects. The spatial and time interaction of the objects may be indicated in graph 114. As shown in FIG. 1B, graph 114 includes nodes that are fully connected to each other by the edges of graph 114. The fully connected nodes by the edges of graph 114 are indicative of the complex interaction of the objects that include spatial information and temporal information.

In some cases, a type of interaction may be indicated, which is described next with reference to FIG. 1C.

Figure 1C:
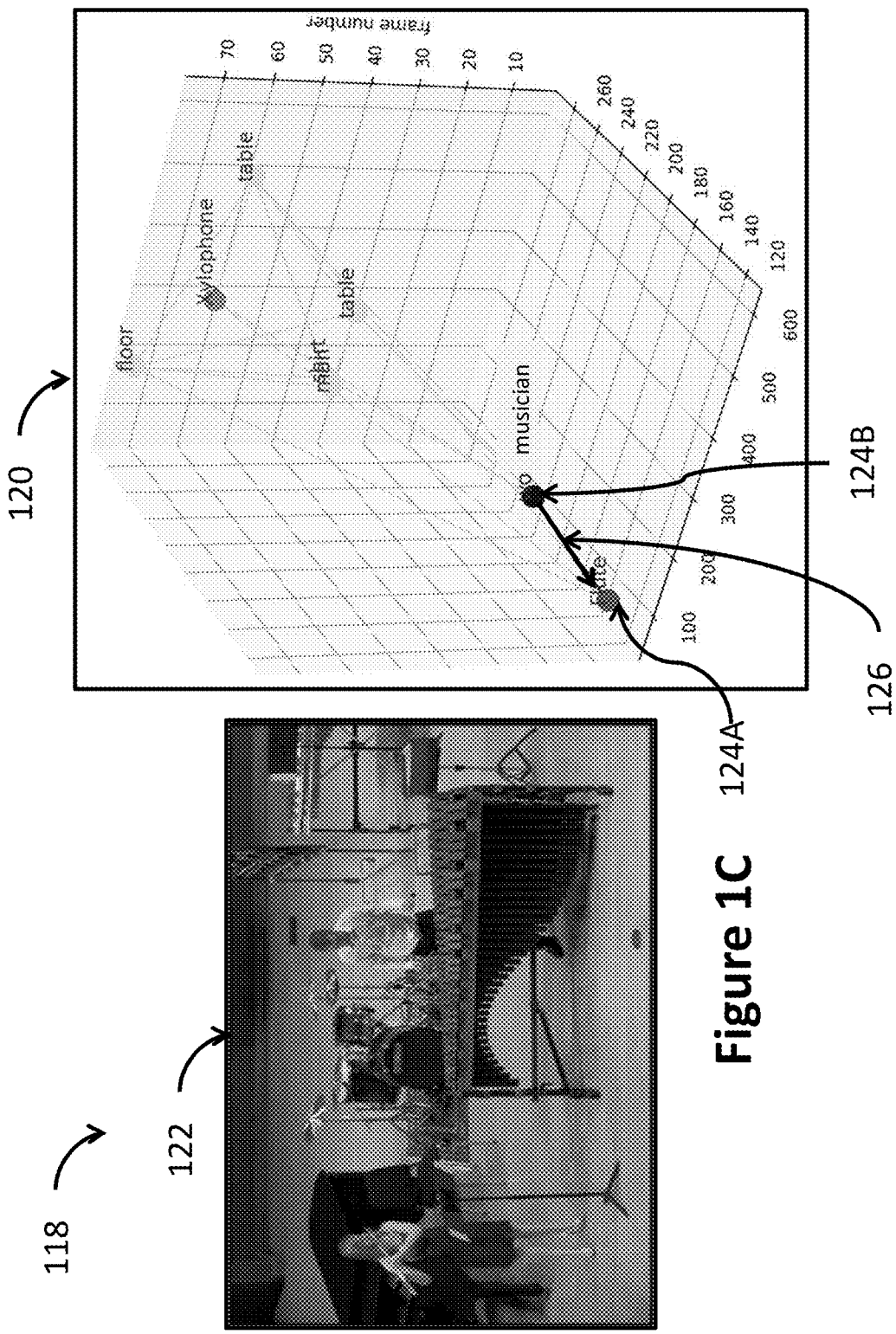
FIG. 1C shows an audio-video representation of a scene as a graph, according to some other embodiments.

FIG. 1C shows a representation 118 depicting a graph 120 of a scene, according to some other embodiments. Graph 120 corresponds to the scene of video 122 that includes musicians, musical instruments, etc.

In some cases, some objects of the scene interacting with each other may equally contribute to generating a sound. For instance, a musician may sing while playing a musical instrument, such as a xylophone. In some other cases, the objects may not equally contribute to generating the sound. For instance, another musician may only play a musical instrument, such as a flute. In such cases, the interaction between the musician and the flute may be indicated by a direction of an edge connecting the objects, i.e. the musician and the flute.

In graph 120, node 124A indicates the flute, and node 124B indicates the musician playing the flute. Further, each of the objects, i.e. the flute and the musician may be distinguished into a principal object and a context object. An edge 126, of graph 120, associated with audio features connects a principal object generating the sound and a context object causing the principal object to generate the sound. Edge 126 has a direction pointing from node 124B of the context object to node 124A of the principal object. In particular, the object, i.e. the flute that generates the sound is defined as a principal object and the object, i.e., the musician that causes the generation of the sound by playing the flute is defined as a context object. Node 124A and node 124B are connected by a directed edge, such as edge 126. Further, edge 126 may be associated with audio features corresponding to the flute sound generated by the interaction of the musician and the flute. The audio features corresponding to the flute sound may be associated with edge 126 by determining corresponding visual features of the flute sound in the scene.

Figure 1D:
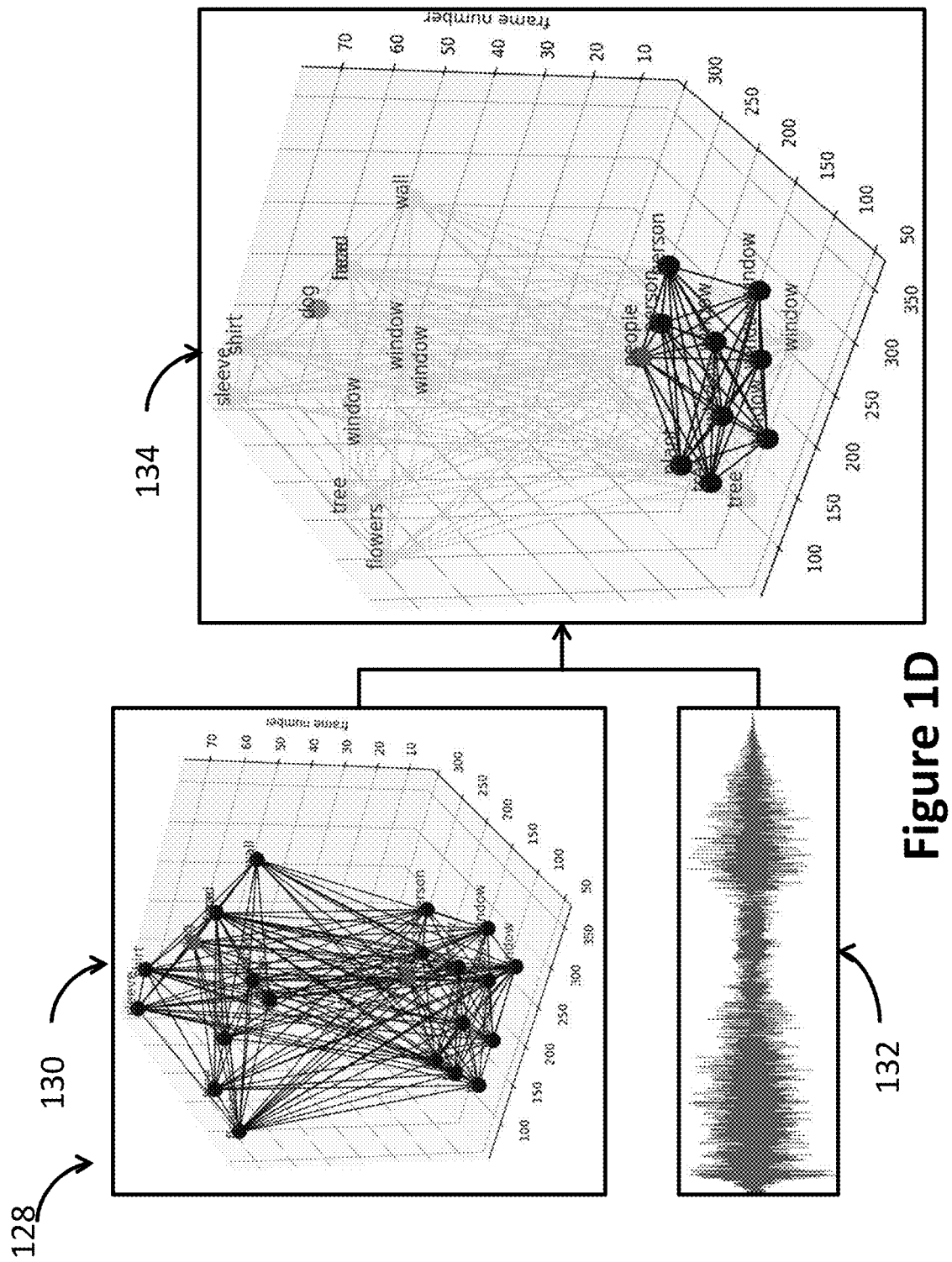
FIG. 1D shows an audio-video representation of a scene as a graph, according to some other embodiments.

In some embodiments, one or more sub-graphs of graph 120 may be created for the visual features in the scene, which is described in FIG. 1D.

FIG. 1D shows a representation 128 depicting a graph 130 of a scene, according to some other embodiments. The graph 130 corresponds to the graph 120. The graph 130 includes nodes fully connected by multiple edges that indicate complex interaction of objects corresponding to the spatial information and the temporal information of a video, e.g., the video 122. Further, the edges may be associated with audio features corresponding to a sound generated by interactions of the objects. The audio features are associated with the edges based on visual features of the objects. The visual features may be derived from a sub-graph 134 of the graph 130. The sub-graph 134 may provide an embedding vector that provides orthogonality to the audio features. Due to the orthogonality of the audio features, a space required by a memory to store the graph 130 may be reduced. Further, the embedding vector may be used in separating the audio features from an audio mixture of multiple sounds in the scene. The audio mixture may be represented by a mixed audio spectrogram 132.

Likewise, different audio features for different interactions may be separated using one or more sub-graphs, such as the sub-graph 134 from a complete graph, such as the graph 130. Such sub-graphs are further shown in FIG. 1E.

Figure 1E:
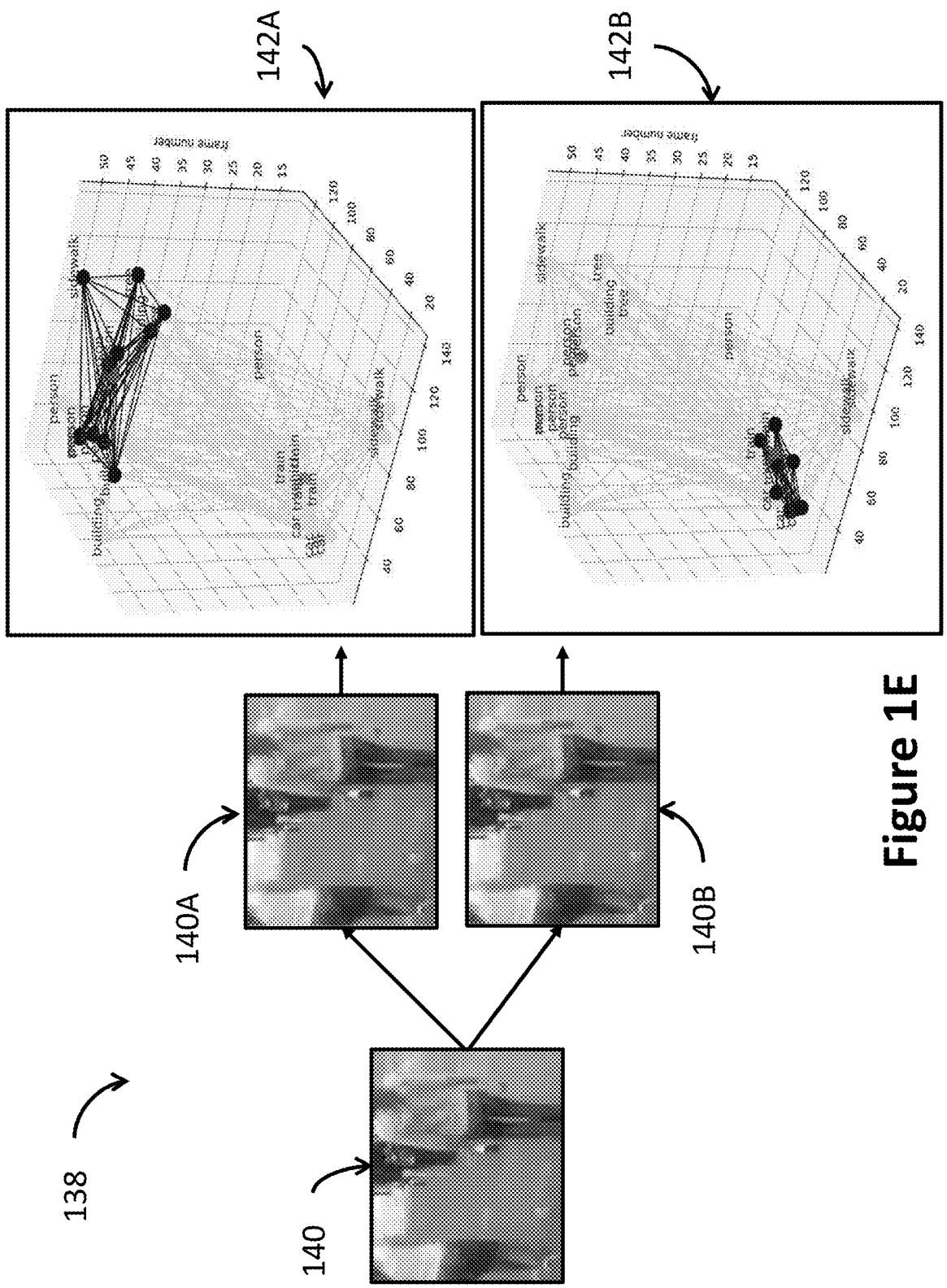
FIG. 1E shows an audio-video representation of a scene as a graph, according to some other embodiments.

FIG. 1E shows a representation 138 depicting one or more sub-graphs, such as a sub-graph 142A and a sub-graph 142B of a graph, e.g., the graph 130 of a scene of a video 140, according to some embodiments. The sub-graph 142A corresponds to visual features 140A in the video 140 and the sub-graph 142B corresponds to visual features 140B in the video 140. For instance, the visual features 140A include features of objects, such as people and the visual features 140B includes features of objects, such as vehicles.

To that end, the sub-graph 142A includes nodes indicative of people in the scene and edges indicative of interaction of the people. The sub-graph 142B includes nodes indicative of vehicles like cars, trains or the like in the scene and edges indicative of interaction of the vehicles. The edges of each the graph 142A and the graph 142B may be associated with audio features such that the audio features associated with different edges are orthogonal to each other that help in separation of corresponding audio features of people and vehicles from a variety of sounds in the video 140.

Such graph representation that includes information of different objects in the scene, and different interactions of the objects, such as the spatial and temporal interaction may be suitable for complex and rich representation of an audio-video scene of an environment. The graph representation may be generated by a system, which is described next with reference to FIG. 2.

Figure 2:
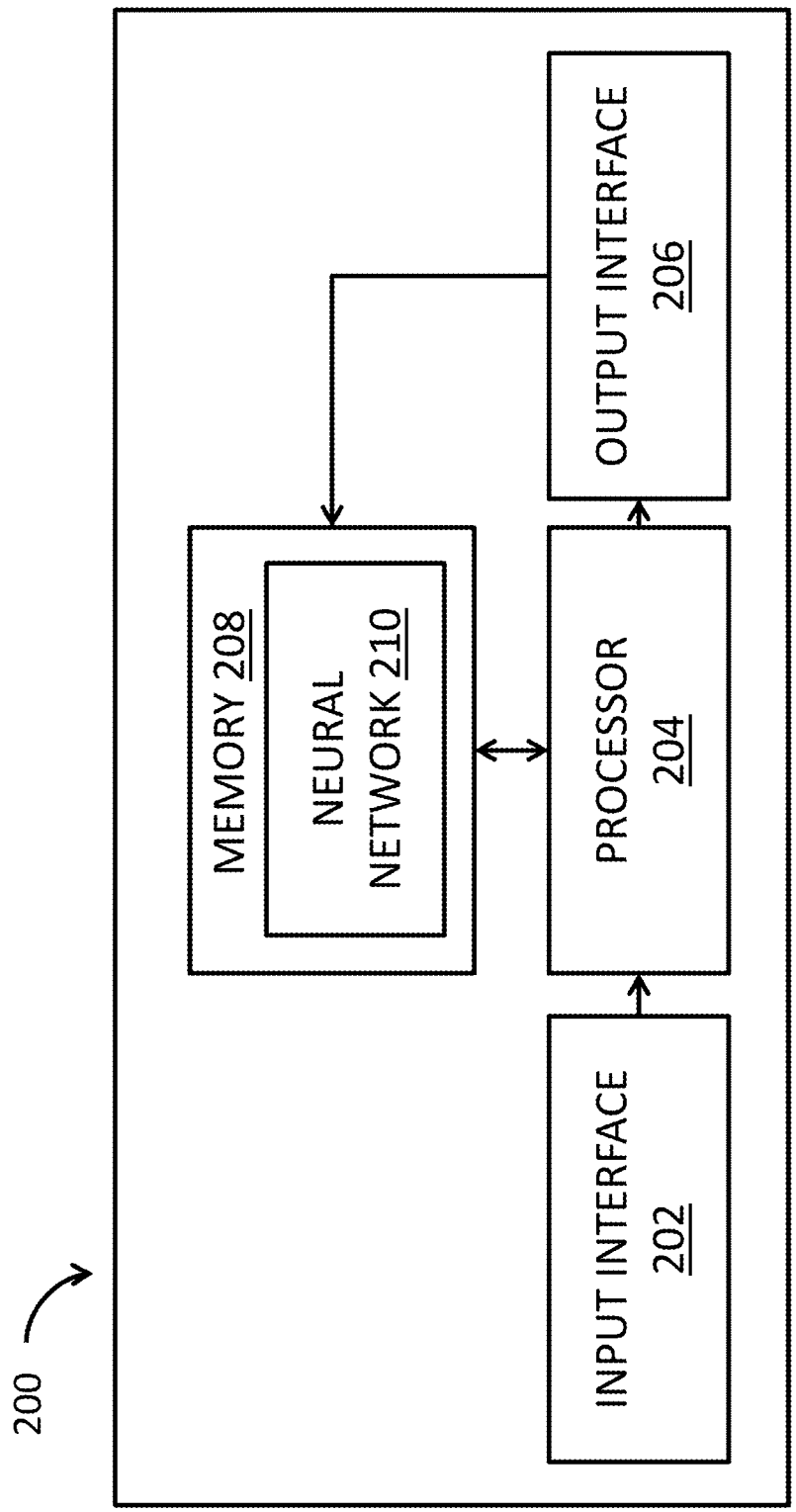
FIG. 2 shows a block diagram of a system for generating an audio-video representation of a scene, according to some embodiments.

FIG. 2 shows a block diagram of a system 200 for generating an audio-video representation of a scene, according to some embodiments. The system 200 includes an input interface 202, a processor 204, an output interface 206 and a memory 208. In some example embodiments, the memory 208 is configured to store a neural network 210. In some other example embodiments, the memory 208 may be further configured to store an audio mixture of multiple sounds in the scene.

The input interface 202 is configured to accept audio and video frames of the scene. Some embodiments are based on understanding that a joint extraction of video and audio features may improve an overall performance of the system 200. Accordingly, the processor 204 may be configured to execute the neural network 210 to transform the accepted audio and video frames into a graph (e.g., the graph 102) of the audio-video representation of the scene that includes nodes (e.g., the nodes 104A-104G) connected by edges (e.g., the edges 106A-106G).

In the graph 102, at least one or more edges (e.g., the edge 106A) are associated with audio features of a sound generated by interaction of two corresponding objects (e.g., the node 106A and the node 106B). Such a multi-modal graph (e.g., the graph 102) allows seamless inter-modality interaction, which helps in executing various tasks such as multitask learning, and the like. To that end, the audio features of the corresponding sound are separated from an audio mixture (e.g., the mixed audio spectrogram 132). The mixed audio spectrogram 132 includes a mixture of multiple sounds of the scene or a variety of sounds for each type of the principal object. The separation of the audio features is further explained in detail in FIGS. 3A and 3B.

Figure 3A:
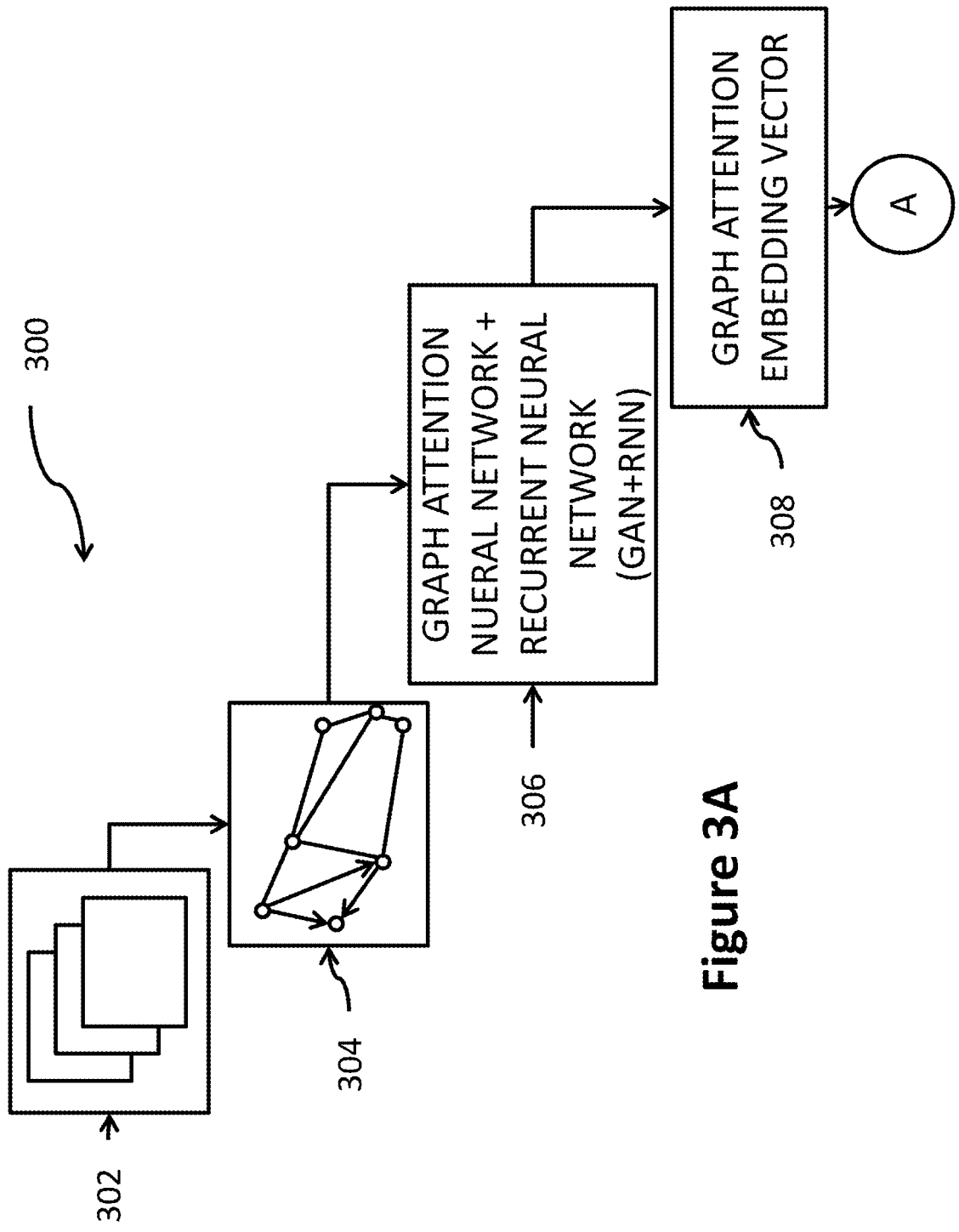
FIGS. 3A and 3B show a schematic diagram depicting extraction of audio and video features from video frames for generating an audio-video representation of a scene, according to some embodiments.
Figure 3B:
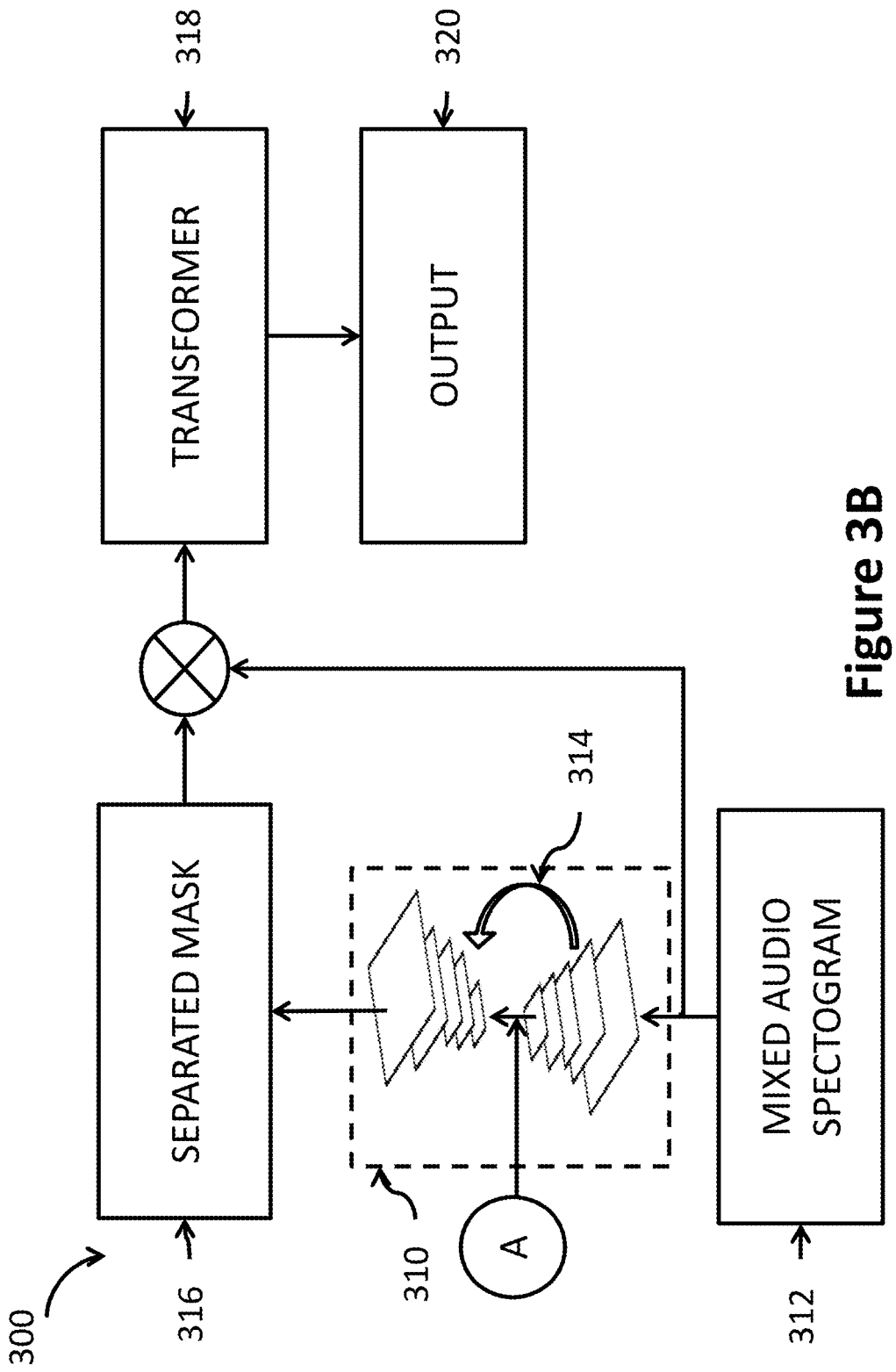

FIGS. 3A and 3B shows a schematic diagram 300 depicting separation of audio and video features from a video 302 for generating a graph (e.g., the graph 102) of a scene, according to some embodiments. The separation of audio and video features is performed by the system 200. The video 302 is provided as input to the system 200.

In some example embodiments, objects in the video 302 may be detected and classified using object detection and classification techniques. The object detection and classification techniques may include, but are not limited to, a faster Region-based Convolutional Neural Networks (R—CNN) model and a ResNet that generates bounding boxes for the detection of objects in the video frames 302. The ResNet may be pre-trained based on dataset, e.g., a Visual Genome dataset.

After the object detection and classification, video features of the objects may be extracted from the video 302. In an example embodiment, the video features may be extracted as feature vectors. For instance, the feature vectors of the video features from the video frames 302 may include 2048 dimensional vectors. Further, the audio features from the video frames 302 may be detected based on a trained audio dataset. For instance, audio features corresponding to a music dataset may be trained on an audio dataset, such as an AudioSet dataset. The audio features may be extracted as feature vectors, e.g., 512 dimensional vectors. In some embodiments, the dimensional vectors of the video features may be encoded according to dimensions of the audio features to maintain a consistency of feature dimensions of the audio and video features. To that end, the video dimensional vectors may be encoded into dimensions of the audio features. For instance, 2048 dimensional vectors of the video features are encoded into 512-dimensions. In this manner, the video dimensional vectors of the video features are aligned to the dimensional vectors of the audio features and a common representation for different audio and video modalities is obtained. Further, the alignment of different audio and video modalities enables a system (e.g., the system 200) to concurrently perform multiple tasks, while precluding pre-processing and/or post-processing task, such as captioning. In some example embodiments, the dimensional vectors may be encoded using an artificial neural network, such as a 2-layer Multi-layer perceptron with a rectified linear (ReLU) activation function.

Further, a graph 304 is constructed from the extracted dimension vectors of the video frames 302. The graph 304 is provided as input to a Graph Attention Network (GAN) and Recurrent Neural Network (RNN) 306. In an example embodiment, the GAN and RNN 306 may process the graph 304 that includes i) updating nodes of the graph 304, ii) capturing pair-wise interactions between the nodes of the graph 304 and iii) pooling feature vectors of the audio and video features.

The GAN and RNN 306 may include components such as a graph attention network convolution (GATConv), an edge convolution and feature vector pooling. The GATConv updates features of the nodes in the graph 304 based on edge adjacency information and a multi-head graph message-passing, e.g. 4 attention heads for message passing.

After updating the nodes, the GAN and RNN 306 may capture the pair-wise interactions, i.e. edges of the nodes using an edge convolution. In an example embodiment, the edge convolution captures a concatenated vector of two nodes of the graph 304. For instance, the edge convolution captures a concatenated vector of two nodes (512×2=1024). Therefore, dimensional vector for the pair-wise interactions is a 512-dimensional vector. The feature vectors corresponding to the updated nodes and the pair-wise interactions are pooled to obtain a graph attention embedding vector 308. The graph attention embedding vector 308 is a single vector representation. In an example embodiment, the feature vectors may be pooled by using a pooling technique such as Global Max and Average pool technique to obtain the graph attention embedding vector 308.

The graph attention embedding vector 308 is provided as input to an audio-source separation framework 310. The graph attention embedding vector 308 corresponds to visual features (e.g., the visual features 140A and 140B of FIG. 1E) derived from the video 302 that guides the audio-source separation framework 310 for separating audio features of corresponding objects and interactions of the objects.

The audio-source separation framework 310 may include an attention-based neural network architecture that derives the visual features corresponding to objects and interactions of the objects. The attention-based neural network architecture may be trained to provide an attention value to each edge, i.e., an interaction of corresponding two objects in the graph 304. The attentions values correspond to importance of the edge, i.e., importance of the interaction of corresponding two objects in the graph. The audio-source separation framework 310 may include a skip connection 314 that feeds output of a layer as input to next layers by skipping layers in between. The attention-based neural network architecture of the audio-source separation framework 310 is further described in FIG. 3C.

Further, the audio-source separation framework 310 generates a separated mask 316. The separated mask 316 may include embedding vectors that provides orthogonality to the audio features. The orthogonality of the audio features may improve computation speed and allows for uniquely separating a desired audio from a mixed audio. In an example embodiment, the audio-source separation framework 310 separates an audio source of objects and/or interactions from a mixed audio spectrogram 312 based on the embedding vector 308. The mixed audio spectrogram 312 corresponds to the mixed audio spectrogram 132. Further, the separated mask 316 is provided to a transformer 318 for transforming the audio features into a separated audio. The separated audio is provided as an output 320.

Figure 3C:
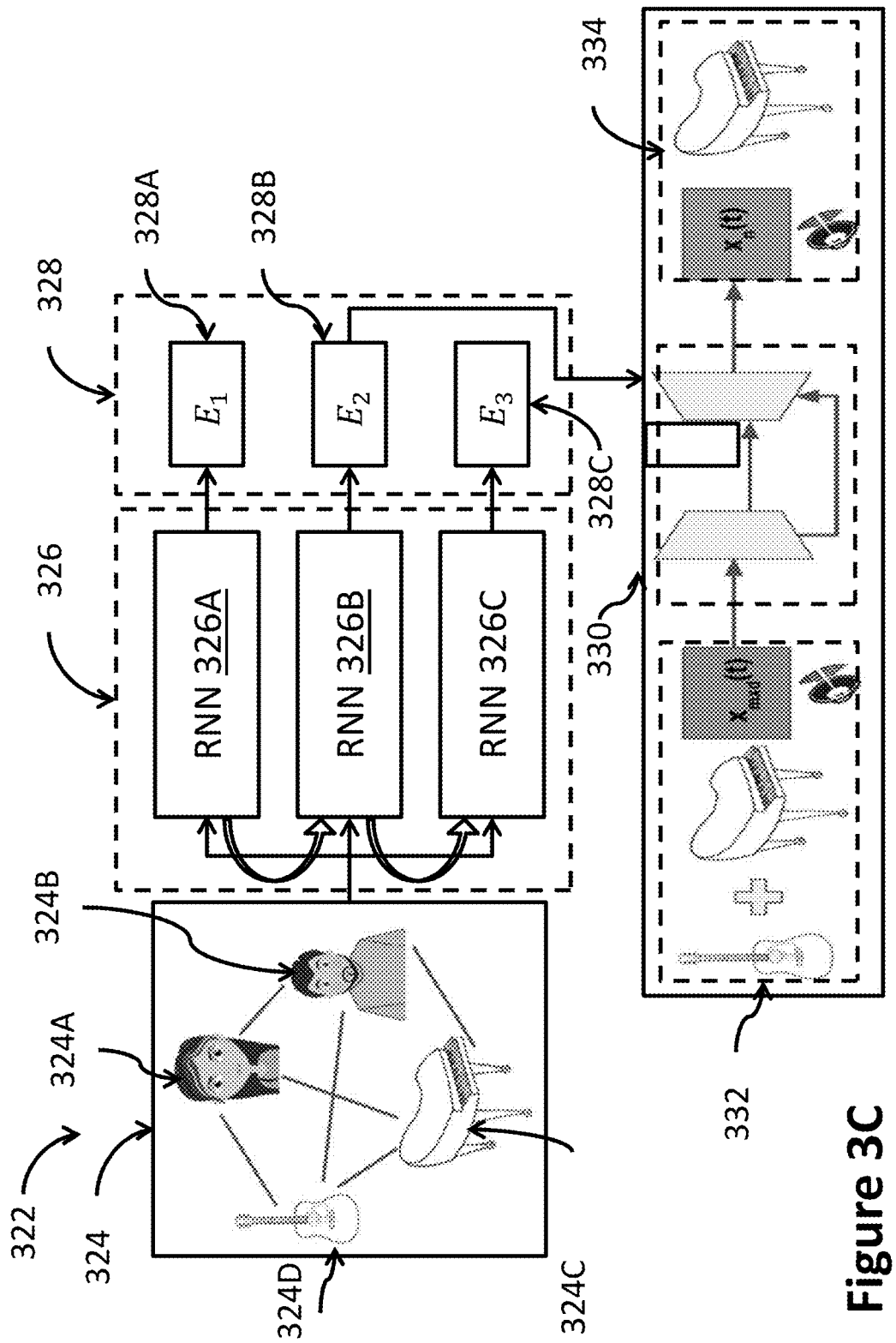
FIG. 3C shows a schematic diagram depicting a framework corresponding to an audio sound source separation task, according to some embodiments.

FIG. 3C shows a schematic diagram depicting an audio-source separation framework 322 corresponding to an audio sound source separation task, according to some embodiments. In an example embodiment, the audio sound source separation task may correspond to separating a piano sound from an audio mixture of a video, e.g. the video 302.

The audio-source separation framework 322 includes a neural network 326. The neural network 326 includes a plurality of subnetworks that correspond to a plurality of RNNs, such as an RNN 326A, an RNN 326B and an RNN 326C (i.e., a plurality of RNNs 326A-326C). The plurality of RNNs 326A-326C may be trained end-to-end to associate the sound with the interaction of corresponding two objects. The plurality of RNNs 326A-326C includes an attention-based subnetwork trained to place different attention to different interactions of different pairs of objects. In some example embodiments, the plurality of RNNs 326A-326C may be trained using a graph 324. For instance, the plurality of RNNs 326A-326C may be trained to provide different attention to different interactions of different pairs of objects in the graph 324. In some embodiments, the plurality of RNNs 326A-326C may perform supervised learning (in particular, self-supervised learning) in order to provide different attention to different interactions of different pairs of objects in the graph 324.

The graph 324 is a fully connected graph with nodes, such as a node 324A, a node 324B, a node 324C and a node 324D. The nodes 324A, 324B, 324C and 324D (or nodes 324A-324D) are indicative of objects, such as musicians, and musical instruments of a scene. For instance, the node 324A and the node 324B corresponds to musicians and the node 324C and the node 324D corresponds to musical instruments, such as a piano and a guitar, respectively. The nodes 324A-324D are fully connected to each other by edges of the graph 324. Such multi-modal alignment of audio and video features enables a system to jointly learn multiple tasks.

The trained plurality of subnetworks 326A-326C may provide embedding vectors 328 that provide orthogonality to the audio features of the objects and interactions of the objects. The embedding vector may be used in separating the audio features from an audio mixture of guitar and piano represented by a mixed audio spectrogram 332. The mixed audio spectrogram 332 corresponds to the mixed audio spectrogram 312.

The embedding vectors 328 includes an embedding vector 328A ($E_1$), an embedding vector 328B ($E_2$) and an embedding vector 328C ($E_3$). Each of the embedding vectors 328A, 328B and 328C corresponds to distinct audio-generating objects in the scene. The embedding vectors 328A-328C may be associated with audio features to the nodes or edges. To that end, the embedding vectors 328A-328C generate spectrogram masks 328 for audio of corresponding objects or interactions. The spectrogram masks 328 correspond to the separated mask 316 of FIG. 3B. In some embodiments, the embedding vectors 328A-328C is associated with the edges by using a binary mask. The binary mask when applied to a mixed audio spectrogram 322 produces the associated audio features.

Further, the spectrogram masks are provided to an audio encoder-decoder 330 for the audio source separation of an object from a mixed audio spectrogram 332. The mixed audio spectrogram 332 corresponds to the mixed audio spectrogram 312. For instance, the mixed audio spectrogram 332 includes a mixture of audio corresponding to musical instruments, such as the guitar and the piano.

When the mixed audio spectrogram 332 is passed to the audio encoder-decoder 330, the embedding vector 328 removes audio of corresponding object, such as audio of the piano from the mixed audio spectrogram 332. The separated audio of the piano is obtained as output 334. After the training, the plurality of subnetworks 326 learns to produce the spectrogram masks that remove audio of objects from the mixed audio spectrogram 332.

Accordingly, the graph 324 of a scene-aware audio video representation is provided as an input to a system for performing tasks of different applications. Since the graph 324 includes the nodes 324A-324D which are fully connected, a system using such a graph becomes capable to handle new tasks in an efficient manner with low computation complexity and low consumption of storage.

The system for performing the tasks using the graph is further described next in FIG. 4.

Figure 4:
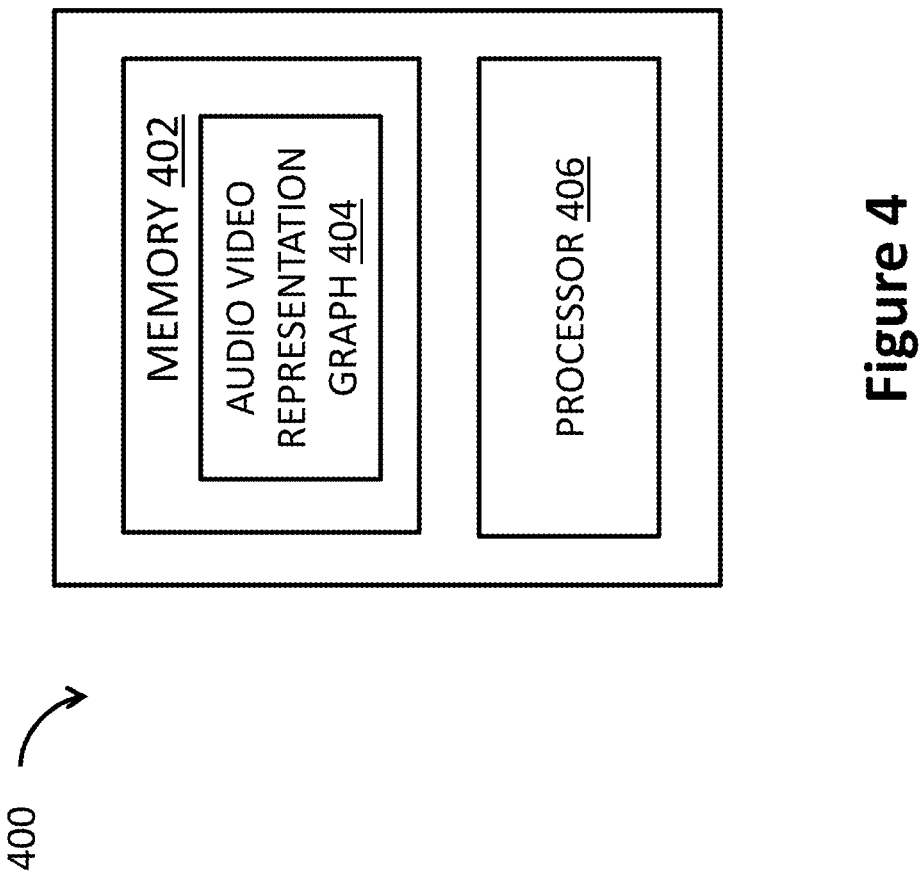
FIG. 4 shows a block schematic diagram of a system for performing a task using a graph of an audio-video representation of a scene, according to some example embodiments.

FIG. 4 shows a block schematic diagram of a system 400 for performing a task using a graph of an audio-video representation of a scene, according to some example embodiments. The system 400 includes a memory 402 storing an audio-video representation graph 404 and a processor 406 operatively connected to the memory 402. The memory 402 may be a non-transient memory. The audio-video representation graph 404 corresponds to the graph 324. The processor 406 is configured to perform a task using the audio-video representation graph 404. The task may include one or a combination of an action recognition, an anomaly detection, a sound localization and enhancement, a noisy-background sound removal, and a system control.

The one or a combination of the action recognition, the anomaly detection, the sound localization and enhancement, the noisy-background sound removal, and the system control are further described with reference to FIG. 5, FIG. 6 and FIG. 7.

Exemplar Embodiments

Figure 5:
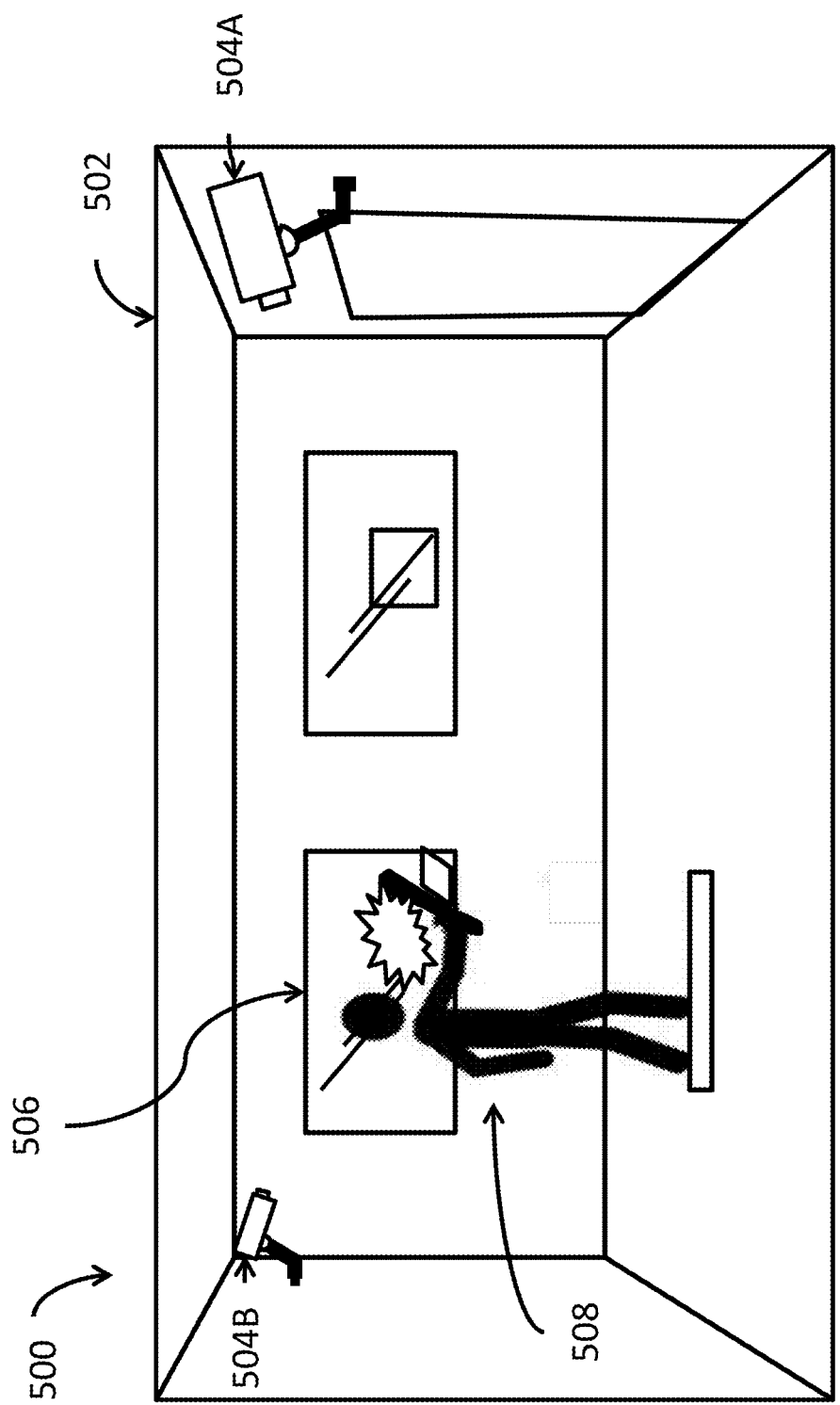
FIG. 5 shows an exemplary scenario corresponding to a task using the system of FIG. 4, according to some example embodiments.

FIG. 5 illustrates an exemplary use case 500 implementation of the system 400, according to some example embodiments. The use case 500 corresponds to an anomaly detection application, such a security surveillance application. In an illustrative example scenario, events occurring in a location 502 may be captured by one or more cameras, such as a camera 504A and a camera 504B installed at different points in the location 502. The location 502 may include an indoor area or an outdoor area of a private property, a public property or the like.

The captured events are provided as input to a system, such as the system 400 via a wired or wireless network connection. The system 400 processes the captured events to recognize actions and detect anomaly actions or events using a graph of an audio-video representation of a scene, such as the graph 404.

For instance, the cameras 504A and 504B capture a video of breaking a window 506. Each of the cameras 504A and 504B captures the video of a person 508 breaking the window 506 with a stick. As shown in FIG. 5, the camera 504A captures a front side of the person 508 and the camera 504B captures back side of the person 508. The captured videos of such an event are sent to the system 400. The system 400 generates a graph corresponding to a scene of the event captured by both the cameras 504A and 504B. The system 400 recognizes action of the person 508 and detects an anomaly action based on the graph.

Additionally or alternatively, the system 400 may localize and enhance a sound, such as sound of breaking the window 506 for detecting an anomaly event. For instance, the camera 504B may be occluded to capture the stick in the hand of the person 508. In some cases, ambience of the location 502 may affect in capturing the video by the cameras 504A and 504B. In such cases, the breaking sound of the window 506 may be sent to the system 400. The system 400 may perform sound localization and enhancement of the breaking sound and detect the anomaly event based on the localized and enhanced breaking sound.

In a similar manner, the system 400 may be used in a vehicle driver assistance system, which is described next in FIG. 6.

Figure 6:
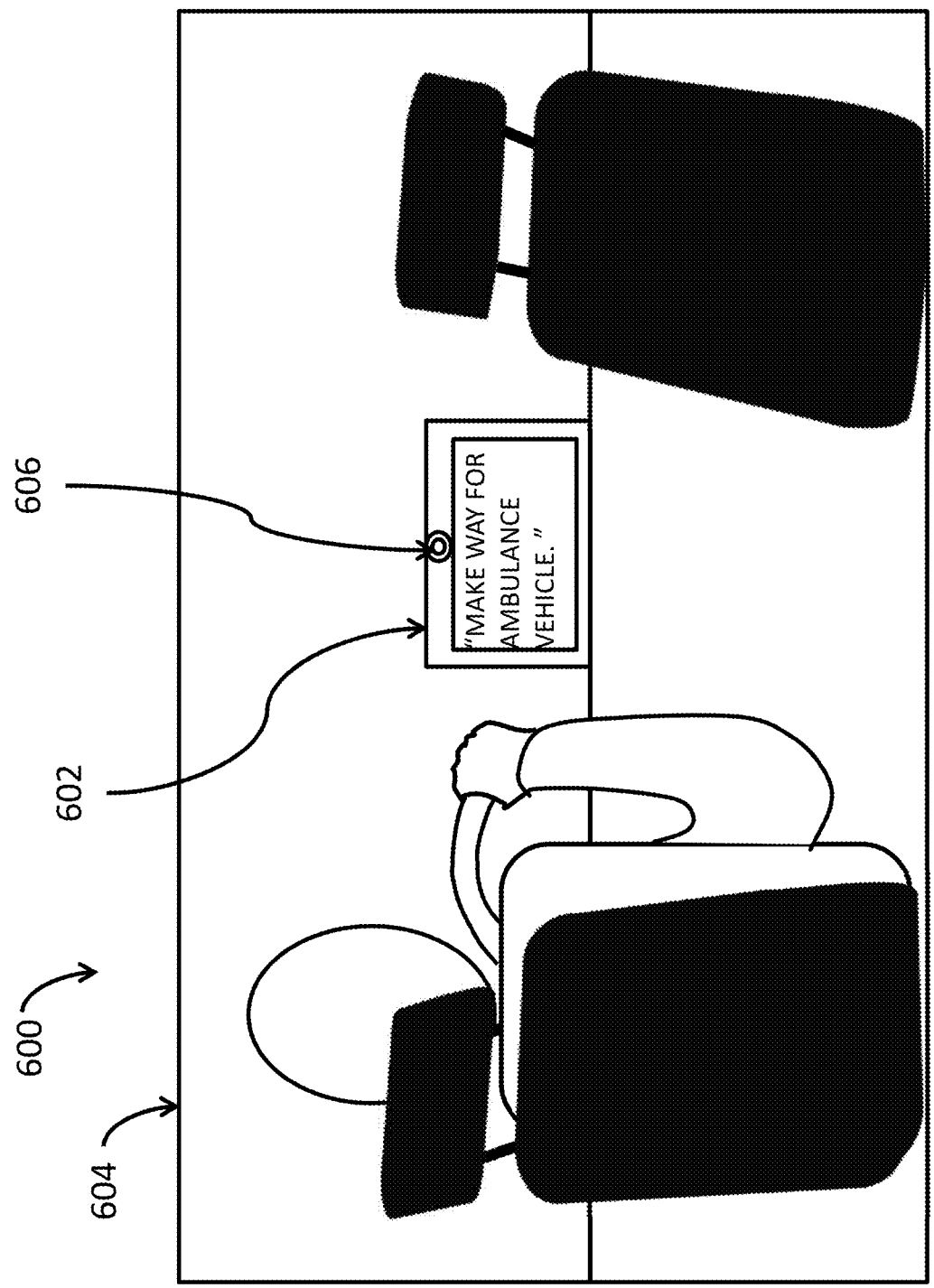
FIG. 6 shows an exemplary scenario corresponding to a task using the system of FIG. 4, according to some other example embodiments.

FIG. 6 illustrates an exemplary use case 600 implementation of the system 400, according to some other example embodiments. The use case 600 corresponds to a vehicle driver assistance system 602 of a vehicle 604. The vehicle 604 may correspond to an autonomous vehicle, a manually-operated vehicle or a semi-autonomous vehicle.

The vehicle driver assistance system 602 may include one or more camera, such as a dashboard camera 604 that captures a video of a road when the vehicle 604 is driven. The vehicle driver assistance system 602 may also include a rear camera (not shown in FIG. 6).

The vehicle driver assistance system 602 may send the captured video to the system 400. The system 400 may process the captured video and assist in navigation of the vehicle 604. For instance, the system 400 may detect and identify a vehicle, such as an ambulance that may be behind the vehicle 604 based on sound of the ambulance vehicle. The vehicle driver assistance system 602 may receive information of the detected ambulance vehicle and instruct a driver or an operator of the vehicle 604. For instance, the driver or the operator may be instructed to move aside to make way for the ambulance vehicle. Additionally or alternatively, the instruction may be displayed via an interface of the vehicle driver assistance system 602. In some other cases, the instruction may be give via an audio output of the vehicle driver assistance 602. For instance, the instruction may include "Make way for the ambulance".

In some cases, the ambulance vehicle may be detected based on a sound produced by the ambulance vehicle, such as a siren, a bell, or the like.

Figure 7:
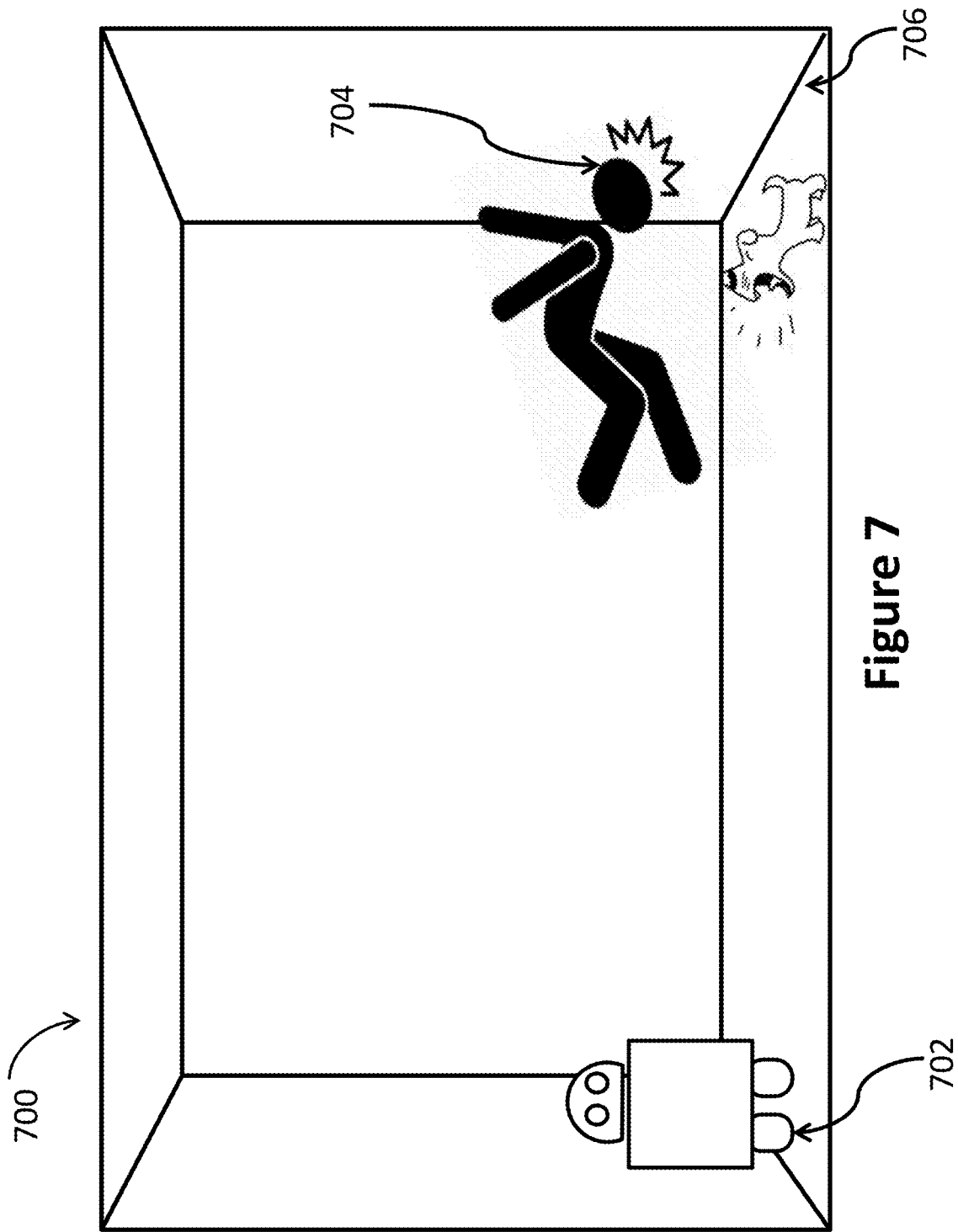
FIG. 7 shows an exemplary scenario corresponding to a task using the system of FIG. 4, according to some other example embodiments.

FIG. 7 illustrates an exemplary use case 700 implementation of the system 400, according to some other example embodiments, according to some other example embodiments. The use case 700 corresponds to a human assistive system 702. In an illustrative example scenario, a person 704 may fall or hit on a wall. When the person 704 falls, a sound of the fall may be low. At the same, the falling sound may be interfered by an object 706. The object 706 may correspond to a dog. The dog may bark when the person 704 falls down.

The human assistive system 702 may capture a video of the person 704 falling and the dog 706 barking. In some cases, the human assistive system 702 may not be able to detect the fall of the person 704 due to interference by the object 706. In such cases, the human assistive system 702 may send the video to the system 400.

The system 400 may process the video received from the human assistive system 702 using the audio video representation graph 404 in the memory 402. For instance, the system 400 may reduce the interfering sound, i.e., the barking sound of the object 706 and enhance the sound of the fall of the person 704 based on the audio video representation graph 404. Further, the system 400 may detect anomaly action or event based on the enhanced sound of the fall. The system 400 may also detect the fall as an anomaly action and send the detected anomaly action to the human assistive system 702. The human assistive system 702 may trigger an alert to assist the person 704. For instance, the human assistive system 702 may send an alert message to a care taker of the person 704. In some cases, the human assistive system 702 may raise an emergency call for medical assistance of the person 704.

In such a manner, the system 400 may be used for different applications using the audio video representation graph. The audio video representation graph includes provides information that capture spatial variation of objects in a spatial domain and their evolution in a time domain. The information of the spatial variation and the evolution of the objects in the time domain may increase accuracy of an outcome of the different applications. Further, the audio video representation graph may enable the system 400 to process new tasks in an efficient manner with low computation complexity and low consumption of storage.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A system for processing an audio-video representation of a scene, comprising: at least one processor; and a non-volatile memory having instructions stored thereon that, when executed by the at least one processor, cause the system to:

process an audio-video representation of a scene as a graph of nodes connected by edges, wherein a node in the graph is indicative of video features of an object in the scene, wherein an edge in the graph connecting two nodes indicates an interaction of corresponding two objects in the scene, and wherein at least one or more edges in the graph are associated with audio features of a sound generated by the interaction of the corresponding two objects, wherein, to process the audio-video representation of the scene, the instructions cause the system to generate the graph of nodes from audio and video signals, store the graph of nodes in the memory, perform a task based on the graph of nodes, or a combination thereof, and wherein, wherein the edge associated with audio features connects a principal object generating the sound and a context object causing the principal object to generate the sound, and wherein the edge has a direction pointing from a node of the context object to a node of the principal object.

2. The system of claim 1, wherein the interaction of corresponding two objects in the scene includes one or a combination of spatial interaction and time interaction.

3. The system of claim 1, wherein at least one node in the graph is associated with audio features of a sound generated by a corresponding object without interaction with other objects in the scene.

4. The system of claim 1, wherein multiple edges in the graph are associated with audio features, and wherein audio features associated with different edges are orthogonal to each other.

5. The system of claim 4, wherein the audio features are associated with multiple edges based on visual features of corresponding objects of the audio features, and wherein the visual features correspond to one or more sub-graphs of the corresponding objects from the graph.

6. The system of claim 1, further configured to store an audio mixture of multiple sounds in the scene, wherein the audio features associated with the edge are represented by a binary mask and wherein the binary mask when applied to the audio mixture produces the associated audio features.

7. The system of claim 1, further comprising:
an input interface configured to accept audio and video frames of the scene, wherein the at least processor is configured to execute a neural network trained to transform the accepted audio and video frames into the graph of nodes connected by the edges; and
an output interface configured to store the graph of nodes connected by the edges in the memory.

8. The system of claim 7, wherein the neural network includes a plurality of subnetworks trained end-to-end to associate the sound with the interaction of corresponding two objects, and wherein the plurality of subnetworks includes an attention-based subnetwork trained to place different attention to different interactions of different pairs of objects.

9. The system of claim 1, wherein the at least one processor is configured to perform the task using the graph of nodes connected by the edges providing the audio-video representation of the scene.

10. The system of claim 9, wherein the task includes one or a combination of an action recognition, an anomaly detection, a sound localization and enhancement, a noisy-background sound removal, and a system control.

11. A method for processing an audio-video representation of a scene, wherein the method uses a processor coupled with stored instructions implementing the method, wherein the instructions, when executed by the processor carry out steps of the method, comprising:
processing an audio-video representation of a scene as a graph of nodes connected by edges, wherein a node in the graph is indicative of video features of an object in the scene, wherein an edge in the graph connecting two nodes indicates an interaction of corresponding two objects in the scene, and wherein at least one or more edges in the graph are associated with audio features of a sound generated by the interaction of the corresponding two objects,
wherein, the processing includes one or a combination of generating the graph of nodes from audio and video signals, storing the graph of nodes in a memory, and performing a task based on the graph of nodes, and wherein the edge associated with audio features connects object generating the sound and a context object causing the principal object to generate the sound, and wherein the edge has a direction pointing from a node of the context object to a node of the principal object.

12. The method of claim 11, wherein multiple edges in the graph are associated with audio features, and wherein audio features associated with different edges are orthogonal to each other.

13. The method of claim 11, further comprising:
accepting audio and video frames of the scene; and
executing a neural network trained to transform the accepted audio and video frames into the graph of nodes connected by the edges.

14. The method of claim 11, further comprising:
performing the task using the graph of nodes connected by the edges providing the audio-video representation of the scene, wherein the task includes one or a combination of an action recognition, an anomaly detection, a sound localization and enhancement, a noisy-background sound removal, and a system control.

15. A non-transitory computer-readable storage medium embodied thereon a program executable by a processor for performing a method, the method comprising:
processing an audio-video representation of a scene as a graph of nodes connected by edges, wherein a node in the graph is indicative of video features of an object in the scene, wherein an edge in the graph connecting two nodes indicates an interaction of corresponding two objects in the scene, and wherein at least one or more edges in the graph are associated with audio features of a sound generated by the interaction of the corresponding two objects, wherein, the processing includes one or a combination of generating the graph of nodes from audio and video signals, storing the graph of nodes in a memory, and performing a task based on the graph of nodes, wherein, multiple edges in the graph are associated with audio features, and wherein audio features associated with different edges are orthogonal to each other.

16. A system for processing an audio-video representation of a scene, comprising: at least one processor; and a non-volatile memory having instructions stored thereon that, when executed by the at least one processor, cause the system to: process an audio-video representation of a scene as a graph of nodes connected by edges, wherein a node in the graph is indicative of video features of an object in the scene, wherein an edge in the graph connecting two nodes indicates an interaction of corresponding two objects in the scene, and wherein at least one or more edges in the graph are associated with audio features of a sound generated by the interaction of the corresponding two objects, and wherein, to process the audio-video representation of the scene, the instructions cause the system to generate the graph of nodes from audio and video signals, store the graph of nodes in the memory, perform a task based on the graph of nodes, or a combination thereof, and further configured to store an audio mixture of multiple sounds in the scene, wherein the audio features associated with the edge are represented by a binary mask and wherein the binary mask when applied to the audio mixture produces the associated audio features.

* * * * *